United States Patent
Nakata et al.

[11] Patent Number: 5,937,233
[45] Date of Patent: Aug. 10, 1999

[54] IMAGE EDITING APPARATUS THAT EDITS BY DETECTING MARKER APPLIED TO ORIGINAL

[75] Inventors: Hironobu Nakata; Hiroyuki Ideyama, both of Toyokawa; Toshihisa Motosugi, Okazaki, all of Japan

[73] Assignee: Minolta Co., Ltd., Osaka, Japan

[21] Appl. No.: 09/037,835

[22] Filed: Mar. 10, 1998

[30] Foreign Application Priority Data

Mar. 11, 1997 [JP] Japan ................................. 9-056048

[51] Int. Cl.$^6$ ................................. G03G 15/00
[52] U.S. Cl. .................... 399/85; 399/182; 358/537; 395/113
[58] Field of Search ................... 399/9, 84, 85, 399/182, 183, 184; 358/452, 453, 537, 538; 382/164, 175; 395/101, 113

[56] References Cited

U.S. PATENT DOCUMENTS

| | | | |
|---|---|---|---|
| 5,079,625 | 1/1992 | Kitamura et al. | 358/537 |
| 5,216,754 | 6/1993 | Sathi et al. | 395/113 |
| 5,293,463 | 3/1994 | Masuda | 395/101 |
| 5,353,126 | 10/1994 | Aoyama | 358/452 |

FOREIGN PATENT DOCUMENTS 3-236069  10/1991  Japan .
4-068475  3/1992  Japan .

*Primary Examiner*—Joan Pendegrass
*Attorney, Agent, or Firm*—McDermott, Will & Emery

[57] ABSTRACT

In order to improve operability of a copying machine which applies an image processing to an area of an original surrounded by a marker, following processes are carried out. An area of an original surrounded by a marker is detected. It is determined whether or not the number of the detected areas exceeds 30, or the time from starting of detection exceeds three minutes during the detection. If any of those two conditions is satisfied, edit based on the marker is not executed and image data which has undergone full-color copying is output.

20 Claims, 11 Drawing Sheets

ORIGINAL

ORIGINAL READING MEMORY

BLACK

RED

GREEN

BLUE

IMAGE EDITING APPARATUS THAT EDITS BY DETECTING MARKER APPLIED TO ORIGINAL

BACKGROUND OF THE INVENTION

1. Field of the Invention

The present invention relates to an image editing apparatus, and more particularly relates to an image editing apparatus used for a copying machine having a marker edit function which outputs a copy according to a predetermined method of processing for a preliminarily marked region on an original.

2. Description of the Related Art

This application is based on Japanese Patent Application No. 9-056048 filed in Japan, the contents of which is hereby incorporated by reference.

A copying machine has been known which reads an original to which a marker is applied, processes image data in a region surrounded by the marker following a process corresponding to the color of the marker, and outputs a copy.

A problem in such a copying machine is that the region surrounded by the marker is identified to edit an image even if an original such as a color original which does not need image processing is to be copied. Specifically, such a conventional copying machine applies successive processes to a color original which does not need image processing, by retrieving a region surrounded by a marker and processing the original. As a result, an original which does not require processing of an image is to be processed.

SUMMARY OF THE INVENTION

The present invention is made to solve such a problem. An object of the invention is to provide an image editing apparatus which can output image data after processing the data or without processing the data according to characteristics of an image.

In order to attain the object, an image forming apparatus according to one aspect of the invention includes: a receiving unit for receiving image data; a detecting unit for detecting an edit area to which a prescribed edit is applied from the image data received; a measuring unit for measuring time for detection by the detecting unit; and forming unit for forming an image based on the received image data without editing it if a result of the measuring shows the time for detection exceeds a prescribed time.

An image editing apparatus according to another aspect of the invention includes: a receiving unit for receiving image data; a setting unit for setting an edit mode to edit the image data received; a determining unit for determining if the received image data is appropriate for edit when the edit mode is set; and an informing unit for alarming if a result of determination by the determining unit shows that the data is not appropriate for edit.

An image editing apparatus according to still another aspect of the invention includes: a reading unit for reading an image of an original to obtain image data; a detecting unit for detecting a closed area surrounded by a specified color based on the image data which is read; an editing unit for applying a prescribed edit to image data included in the detected closed area; a measuring unit for measuring time for detection by the detecting unit; and a control unit for controlling such that the edit is not applied if the time for detection exceeds a prescribed time.

An image editing apparatus according to still another aspect of the invention includes: a unit for obtaining image data by reading an image of an original; a unit for storing the image data obtained, by separating the data into plural kinds of color data; a detecting unit for detecting a closed area formed of one kind of color data from the color data stored; a unit for measuring time for which detection is carried out by the detecting unit; and an output unit for outputting the obtained image data without editing it if the measured time exceeds a prescribed time and outputting the obtained image data after applying a prescribed edit to image data in the closed area if detection of the closed area is completed within the prescribed time.

According to the invention described above, image data can be output after undergoing any processing or without processing according to characteristics of the image.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

1. Entire Structure of Copying Machine

Figure 1:
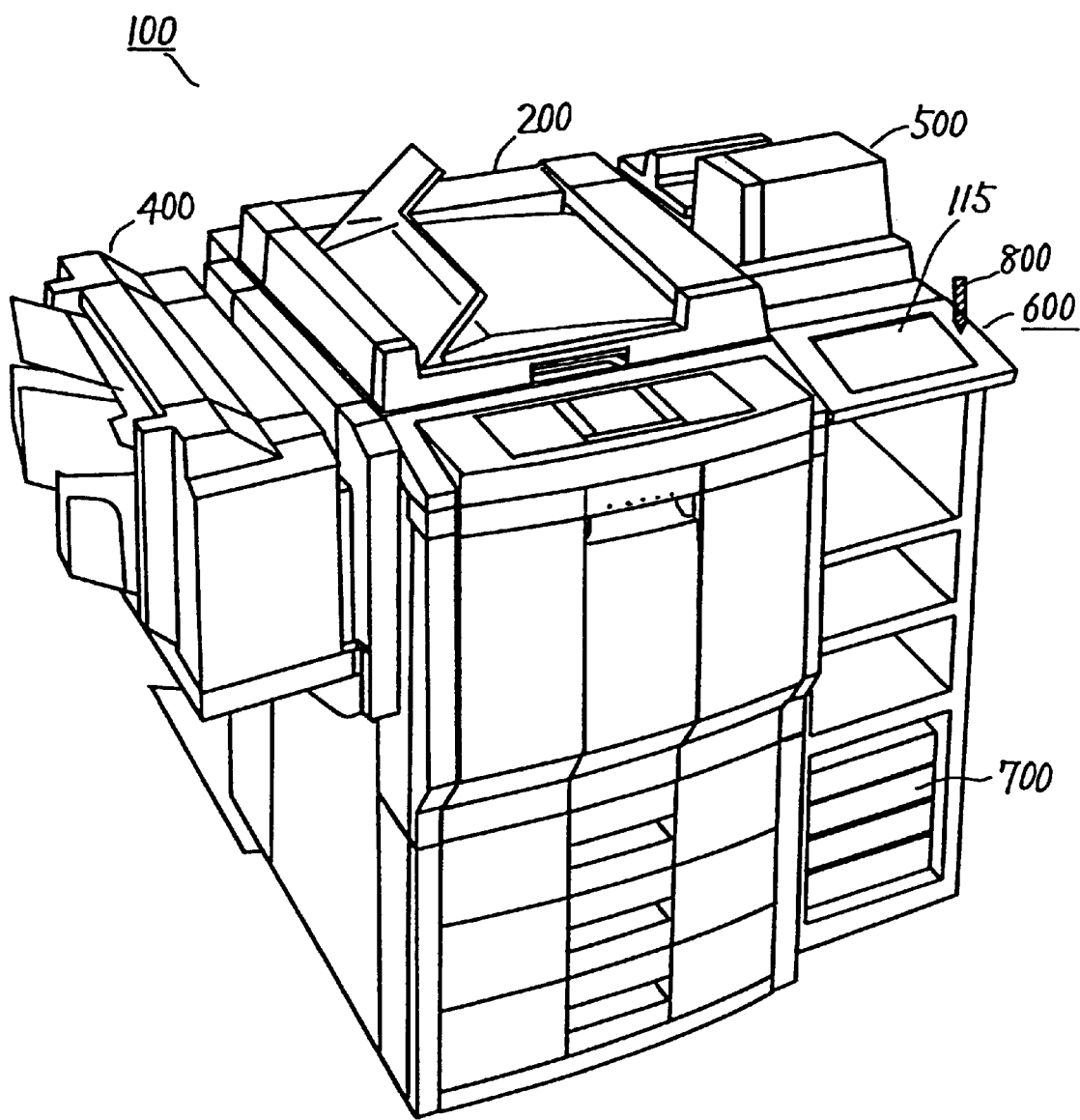
FIG. 1 is an external perspective view of a digital copying machine according to one embodiment of the invention.

FIG. 1 is a perspective view of a digital color copying machine according to an embodiment of the invention.

Referring to FIG. 1, a digital color copying machine 100 includes: an automatic document feeder 200 (hereinafter referred to as ADF 200) for handling volumes of originals; a sorter 400 for sorting copy sheets; a film projector for making a copy of a film original; a screen editor 600 which displays a read original image and receives an operational instruction from an operator; and a printer controller 700 for using this copying machine as a color printer by connecting a personal computer, an EWS (work station) or the like.

Screen editor 600 is provided with a color liquid crystal display unit 115 (hereinafter referred to as color LCD 115) which displays a read original and displays various operation menu pictures for giving an operational instruction to an operator. A transparent tablet 116 (hereinafter referred to as pen input tablet 116) for detecting coordinates designated by an operator is layered over color LCD 115. Coordinates on color LCD 115 can be directly input by an operator with a pen 800.

Figure 2:
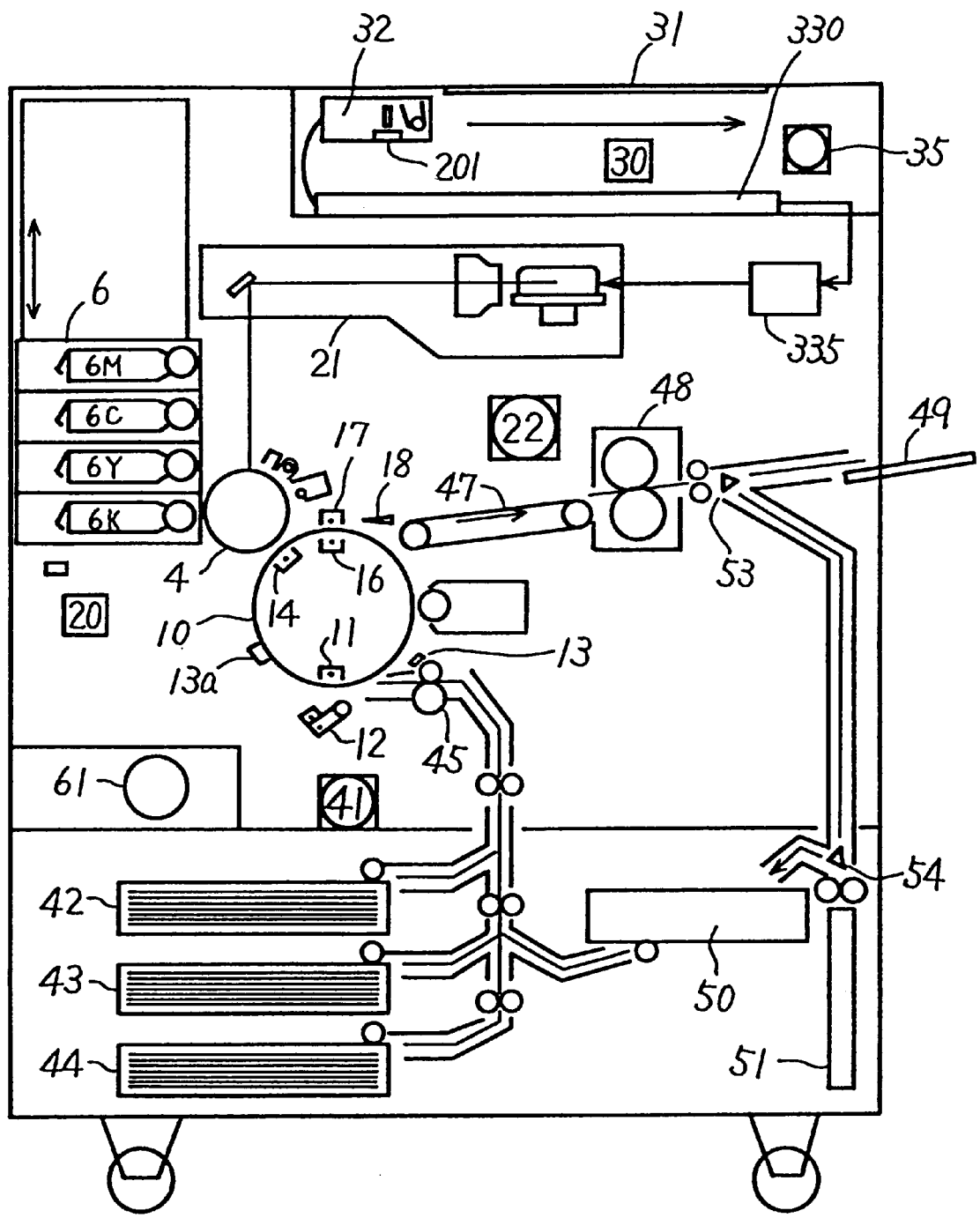
FIG. 2 is a cross sectional view provided for describing a mechanism of the digital color copying machine of FIG. 1.

FIG. 2 is a front cross sectional view provided for describing a mechanism of digital color copying machine 100 of FIG. 1. Note that ADF 200, sorter 400, film projector 500, screen editor 600 and printer controller 700 of FIG. 1 are not shown in FIG. 2.

Referring to FIG. 2, the copying machine is roughly constituted of an image reader 30 and a printer 20. Description of each section is given below.

(a) Image Reader 30

Image reader 30 is provided with a platen 31 on which an original is placed, a scanner 32 for exposing and scanning an original, an image sensor (CCD line sensor) 201 for converting light reflected from the original to an electric signal, an image signal processing section 330 for processing the signal from image sensor 201, a print head control section 335 for outputting an image signal to printer 20 based on the signal from image signal processing section 330, and a pulse motor 35 for driving scanner 32.

An image of an original placed on platen 31 is exposed and scanned by scanner 32, and reflected light from the image undergoes photoelectric conversion by image sensor 201. The photoelectrically converted signal undergoes a prescribed processing by image signal processing section 330 and digital image data for driving a laser diode is produced. The produced digital image data is transmitted to print head control section 335.

(b) Printer 20

Printer 20 is roughly constituted of an image forming section and a sheet processing section. Details are as follows. The image forming section includes a laser unit 21 which is driven according to the digital image data supplied from image reader 30, a photoreceptor drum 4 for writing an electrostatic latent image, a developing unit 6 for developing with toner, a transfer drum 10 for transferring an image onto a surface of a sheet, and a drum drive motor 22 for driving the photoreceptor drum and the transfer drum.

Laser unit 21 is driven by the digital image data input from print head control section 335. Laser unit 21 is driven to form an electrostatic latent image on the surface of photoreceptor drum 4. The electrostatic latent image undergoes toner development by developing unit 6, and the developed image is transferred onto the surface of the sheet kept on transfer drum 10.

Photoreceptor drum 4 and transfer drum 10 are synchronously driven by drum drive motor 22.

Developing unit 6 is constituted of a magenta developing unit 6M which develops with magenta toner, a cyan developing unit 6C which develops with cyan toner, a yellow developing unit 6Y which develops with yellow toner, a black developing unit which develops with black toner, four toner hoppers provided at upper sections of respective developing units for supplying toner of a corresponding color to each developing unit, and a development unit motor 61 for moving the developing unit up and down.

The sheet processing section is constituted of housing cassettes 42–44 in which sheets to be printed are contained, an intermediate housing section 50 in which sheets are temporarily housed, and a reversing unit 51 which reverses the sheets.

A sheet supplied from any of housing cassettes 42–44 or a sheet supplied from intermediate housing section 50 is transported by a transport roller group to transfer drum 10 and rolled on transfer drum 10. Toner images (corresponding to a maximum of four colors) are successively transferred onto the sheet.

The sheet having the transferred image is thereafter separated from transfer drum 10, undergoes image fixing by a fixing unit 48, and is discharged onto a discharge tray 49.

The apparatus is provided with a timing roller pair 45 for adjusting register timing when the sheet is transported as well as a transport belt 47. The transport roller group and transport belt 47 are driven by a main motor 41.

Transfer drum 10 is provided with a leading chuck claw for chucking the leading edge of the sheet, a suction charger 11 for electrostatically attaching the sheet to transfer drum 10 by suction, a sheet press roller 12 for pressing the sheet, a transfer charger 14 for transferring a toner image formed on the photoreceptor drum onto the sheet, dischargers 16 and 17 which discharge the transfer drum to separate the sheet after transfer of the toner image is completed (transfer of toner images of four colors is completed for full-color development), and a separation claw 18 for separating the sheet from the transfer drum.

Once the printing process described above for the sheet is completed, the sheet is supplied to intermediate housing section 50 or discharge tray 49. The destination of the sheet which has undergone the printing process is selected by switching of a transport path switching section 53 provided at a transport path of a sheet to which fixing processing has been applied.

At the transport path from transport path switching section 53 to intermediate housing section 50, a transport path switching section 54 is further placed. Transport path switching section 54 selects either the transported sheet is housed in intermediate housing section 50 after the direction of the travel of the sheet is reversed at reversing unit 51, or directly housed in intermediate housing section 50.

This selection is made for selecting, when the sheet supplied from intermediate housing section 50 is transported to the transfer drum again, either an image is transferred onto a surface where printing has been already applied, or an image is transferred onto a surface opposite to the printed surface.

A reference position sensor 13 for detecting a reference position of the transfer drum, and an actuator plate 13a for operating the reference position sensor are provided for transfer drum 10.

2. Image Edit Mode

Figure 3:
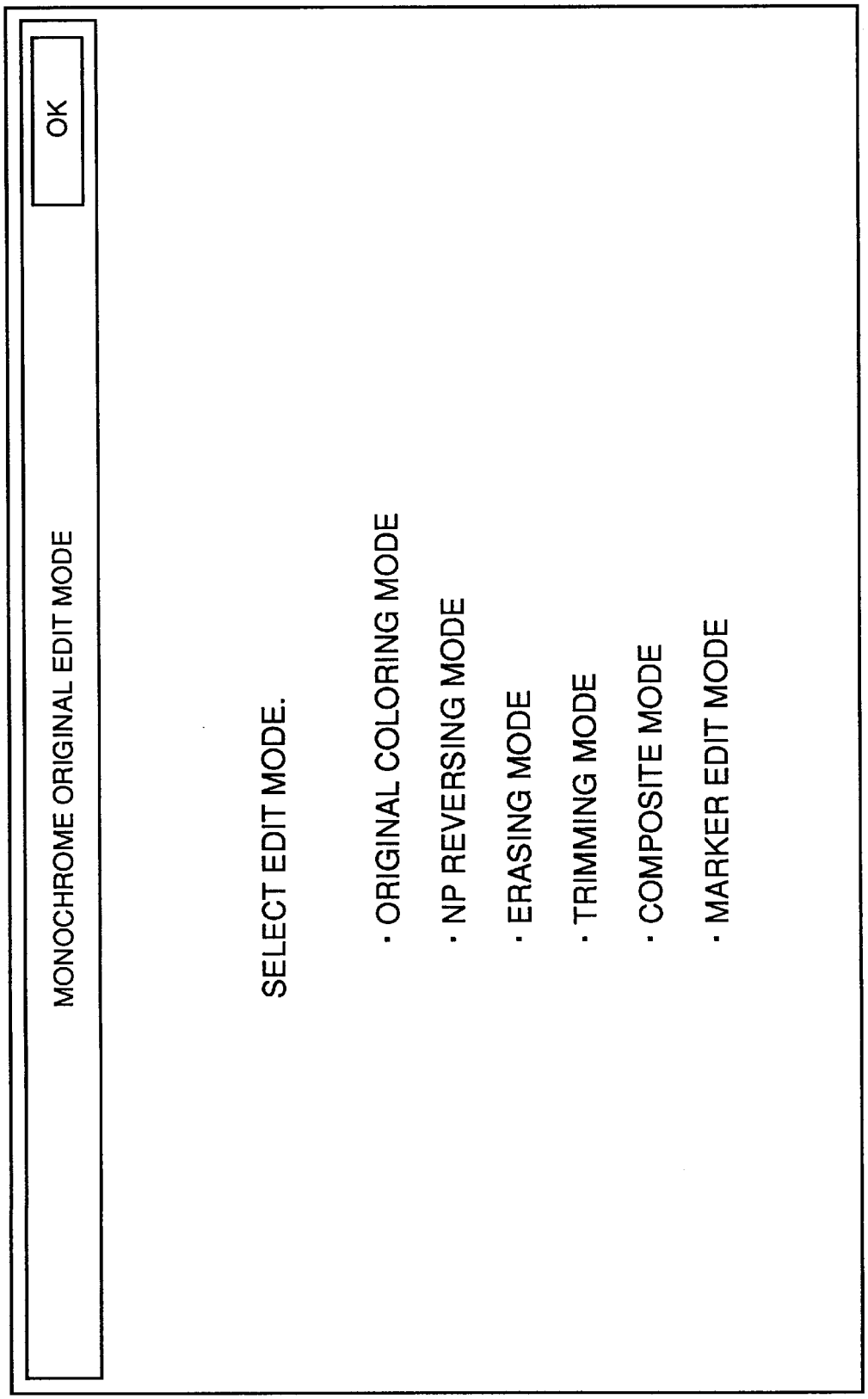
FIG. 3 shows an operation picture for selection of an edit mode for a monochrome original (black and white original).

Various kinds of image edit are possible by using this copying machine. FIG. 3 shows an operation picture displayed on color LCD 115 for selecting an edit mode for a monochrome original (black and white original). Image edit mode which can be carried out by the copying machine is hereinafter described following FIG. 3.

Referring to FIG. 3, the modes which can be selected for a monochrome original are an original coloring mode, a negative-positive reversing mode (NP reversing mode), an erasing mode, a trimming mode, a composite mode, and a marker edit mode.

The function of each edit mode is as follows.

Original Coloring Mode: an original is printed by converting the color of an original image (black portion on a supposition that the original is constituted of black and white) or a background portion (white portion on the supposition that the original is constituted of black and white) into a designated prescribed color for, an edit area on the original designated at pen input tablet 116, or the entire original if the edit area is not designated at pen input tablet 116.

Negative-Positive Reversing Mode (NP Reversing Mode): an original is printed by reversing of negative and positive for, an edit area on the original designated at pen input tablet 116, or the entire original if the edit area is not designated at pen input tablet 116.

Erasing Mode: an original image is printed by erasing an image within an edit area on the original designated at pen input tablet 116.

Trimming Mode: an original image is printed by erasing an image located outside an edit area on the original designated at pen input table 116.

Composite Mode: Two edit areas on an original designated at pen input tablet 116 are combined to be printed on a single sheet.

Marker Edit Mode: An operator sets an edit area to be edited on an original image by surrounding it with a color marker of a prescribed color. The copying machine automatically determines the edit area surrounded by the marker, applies a prescribed edit process to the original image in the edit area and print it out. A maximum eight colors of the color marker can be used, and an arbitrary edit mode can be set for each color. The original coloring mode, the negative-positive reversing mode, the erasing mode and the trimming mode can be set for each color. A correction of and an addition to an edit area designated by the marker can be made by pen input tablet 116, and details are described below.

3. Control Circuit

Figure 4:
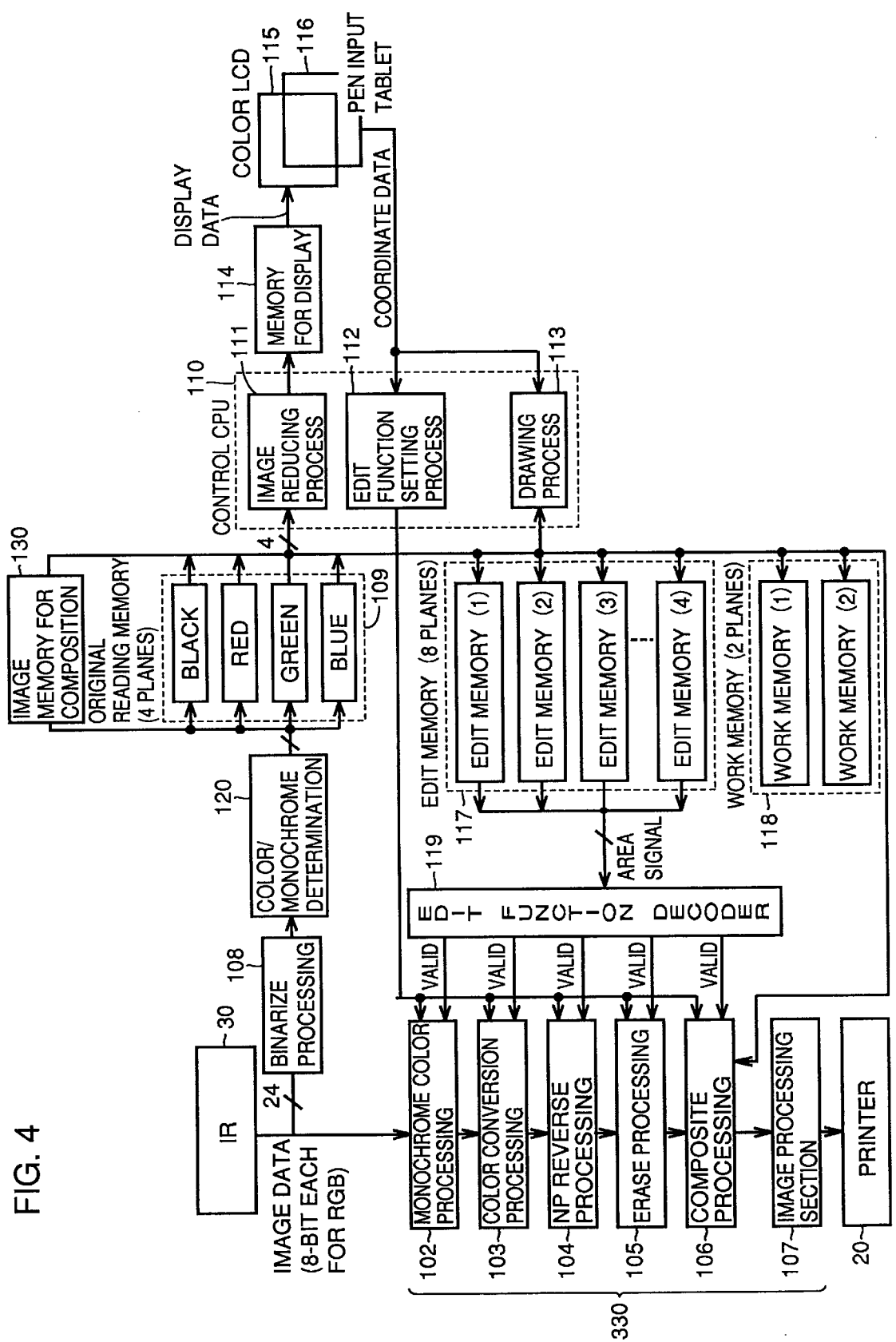
FIG. 4 is a block diagram of a control circuit for image processing provided for the copying machine of FIG. 1.

FIG. 4 is a block diagram of a control circuit having an image signal processing section 330 at its center, for image processing provided for the copying machine of FIG. 1.

With reference to FIG. 4, the control circuit for image processing includes: an image reader 30, a monochrome color processing section 102 executing monochrome color processing by converting image data (8 bits each for respective RGB) obtained by image reader 30 into a prescribed monochrome data; a color conversion processing section 103 executing color conversion processing by converting image data of a specific color of a signal output from monochrome color processing section 102 into image data of another color; a negative-positive reverse processing section 104 executing NP (Negative-Positive) reverse processing for a signal output from color conversion processing section 103; an erase processing section 105 erasing a part of a signal output from NP reverse processing section 104; a composite processing section 106 combining two image data into one image data; and an image processing section 107 for executing other image processings. Image data output from image processing section 107 is supplied to printer 20 to be printed.

As a block for reading an original, displaying it on color LCD 115 and editing it, a binarize processing section 108 binarizing image data output from image reader 30, a color/monochrome determining section 120 determining if the input image is a color image or a monochrome image by generating a histogram of the lightness of the binarized image data, an original reading memory 109 formed of memories corresponding to four planes in which image data output via color/monochrome determining section 120 is divided into image data of four colors of black, red, green and blue and stored, an image memory for composition 130 in which image data is temporarily stored for the composition, a control CPU 110 controlling a read image and an image to be output, a memory for display 114 in which details of display on color LCD 115 are recorded, a color LCD 115, a pen input tablet 116 provided on color LCD 115, an edit memory 117 constituted of memories corresponding to eight planes used for editing image data, a work memory 118 formed of memories corresponding to two planes constituting a working area, an edit function decoder 119 which controls to determine which one of monochrome color processing section 102, color conversion processing section 103, NP reverse processing section 104, erase processing section 105 and composite processing section 106 is made valid based on the recorded data in edit memory 117, are provided.

Control CPU 110 includes an image reducing process section 111 which reduces an image of a read original for displaying it on color LCD 115, an edit function setting process section 112 which sets an edit function based on coordinate data input from pen input tablet 116, and a drawing process section 113 which draws a region to be edited also based on the input coordinate data.

Note that image reducing process section 111, edit function setting process section 112 and drawing process section 113 are each described as a process section for each function of a program executed by control CPU 110, and control CPU 110 includes no hard logic circuit dedicated to each process section for achieving each function.

4. Flow of Processes of Control Circuit

Description of the flow of processes in those blocks shown in FIG. 4 is given below. The process flow is generally divided into two flows. One is a process flow for reading an original to display it on color LCD 115, and the other is the one for printing the read image data by printer 20.

In the process of displaying an original, image data read by image reader 30 is displayed on color LCD 115 via binarize processing section 108, color/monochrome determining section 120, original reading memory 109, control CPU 110 and memory for display 114.

In the printing process, image data read by image reader 30 is output to printer 20 via monochrome color processing section 102, color conversion processing section 103, NP reverse processing section 104, erase processing section 105, composite processing section 106 and image processing section 107.

A flow of processes in the process of displaying an original is described below.

Digital image data output from image reader 30 in the original display process is binarized by binarize processing section 108. Digital image data output from image reader 30 is full-color image data of 400 dpi formed of R, G and B of eight bits each. An enormous amount of memory capacity is required for storing the data directly into the memory as it is. Therefore, the digital image data output from image reader 30 is binarized by binarize processing section 108, and resolution thereof is reduced from 400 dpi to 100 dpi. The amount of information is thus reduced.

The binarized data is input to color/monochrome determining section 120.

Color/monochrome determining section 120 produces a histogram of lightness for all pixels of an original and a histogram of lightness of achromatic pixels of the original. The determining section determines if the original image is a color image or a monochrome image based on the two kinds of histograms.

Image data output from color/monochrome determining section 120 is stored in original reading memory 109.

Original reading memory 109 is constituted of four planes of black, red, green and blue. If the original is a color original, image data of the read original is stored in respective memories for red, green, and blue. If the original is a monochrome original, image data is stored in the memory for black. However, if the original has an edit area designated by a color marker according to the marker edit mode, memories of red, green and blue are used for the monochrome original as described above.

Specifically, in the marker edit mode, image data corresponding to an image of the color marker drawn for designating an edit area with the color marker is stored in memories of red, green and blue. The stored image data corresponds to the image of the color marker, and not the image data corresponding to an original image of the edit area designated by the color marker. Color markers of eight colors expressed by red, green blue and combinations thereof can be used. According to the color of the marker, any one of the memories of red, green, blue or a combination of a plurality of memories is used.

Image data stored in image reading memory 109 is supplied to image reducing process section 111 within control CPU 110 where resolution is further reduced. Since image data in original reading memory 109 has a resolution of 100 DPI but a resolution displayed on color LCD 115 is approximately 30–50 DPI (this resolution depends on the size to be displayed), reduction of the image is further required and the resolution is decreased.

Image data reduced by image reducing process section 111 is stored in memory for display 114. Image data stored in memory for display 114 is directly displayed on color LCD 115.

Pen input tablet 116 is layered over color LCD 115. An operator can easily select an operation menu or designate an edit area by inputting with a pen on to pen input tablet 116.

An operation by an operator such as selection of an operation menu or setting of an edit area are handled by control CPU 110.

Operation menu pictures are successively displayed on color LCD 115 based on coordinate data input to pen input tablet 116, and an operator can make various settings in the interactive manner. Further, a plurality of operation menus constituted hierarchically are successively output onto color LCD 115 so that an operator can select a desired mode.

Once an instruction for image edit input via pen input tablet 116 by an operator (image edit mode setting, setting of an edit area and the like) is established, the instruction is handled by edit function setting process section 112 and drawing process section 113 included in control CPU 110.

Edit function setting process section 112 outputs setting signals to monochrome color processing section 102, color conversion processing section 103, NP reverse processing section 104, erase processing section 105 and composite processing section 106 according to the image edit mode established by the operation of the operator, and enables these processing sections. Accordingly, various kinds of processings are selectively carried out for the digital image data input by image reader 30.

Specifically, monochrome color processing section 102 is enabled if the original coloring mode is set, NP reverse processing section 104 is enabled if the negative-positive reversing mode is set, erase processing section 105 is enabled if the erasing mode or the trimming mode is set, composite processing section 106 is enabled if the composite mode is set, and color conversion processing section 103 is enabled if the color edit mode is set. If the marker edit mode is set, any one or a plurality of monochrome color processing section 102, NP reverse processing section 104 and erase processing section 105 is or are enabled according to the color of each marker in the marker edit mode.

Drawing process section 113 determines an edit area established by operation by an operator (edit area established by designation by the marker or pen input table 116).

Specifically, drawing process section 113 sets an edit area of an image using edit memory 117 and work memory 118. Edit memory 117 is formed of memories of eight planes, and information on an area to be edited is stored in the memory of each plane for each of the set edit mode. An edit area is stored in the memory as an entirely painted figure of the edit area designated by the marker or pen input tablet 116. In other words, only the portion of the figure which is entirely painted and stored in edit memory 117 is to be edited according to the set edit mode.

Edit function decoder 119 inputs an area signal based on the figure stored in edit memory 117, and based on the area signal, outputs valid signals to monochrome color processing section 102, color conversion processing section 103, NP reverse processing section 104 and erase processing section 105 at a timing at which image data corresponding to the set edit area is output from image reader 30. Accordingly, a processing section enabled by edit function setting process section 112 described above applies a prescribed image processing to image data of the edit area.

Work memory 118 formed of two planes is used as a memory for working when drawing processes are executed for edit memory 117.

Data to which image processing is applied is printed onto a sheet following the electrophotographic system by printer.

5. Specific Example of Marker Edit

An operation of the control circuit described above is explained using specific examples of editing in the marker edit mode.

Figure 5A:
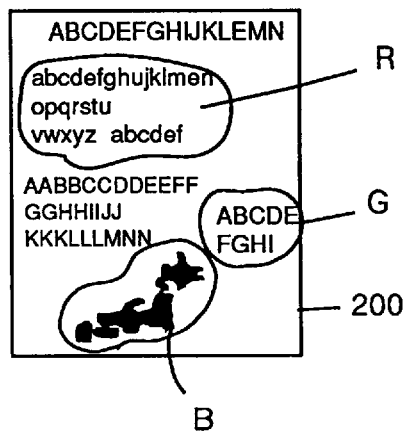
FIGS. 5A and 5B show specific examples of the edit in a marker edit mode.

Suppose that an operator sets, as shown in FIG. 5A, following the marker edit mode, the negative-positive reversing mode for an edit area surrounded by the red marker, the original coloring mode for an edit area surrounded by the green marker, and the erasing mode for an edit area surrounded by the blue marker, and marks the original with markers of red R, green G and blue B respectively.

The original is read by image reader 30, binarized by binarize processing section 108, and stored in original reading memory 109 via color/monochrome determining section 120.

Figure 5B:
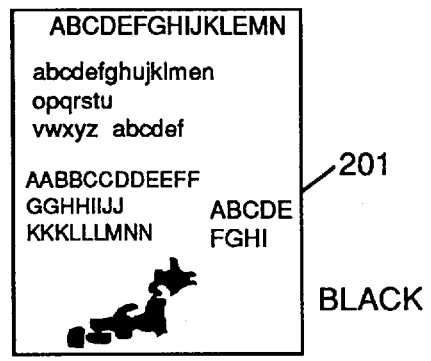
Figure 5B:
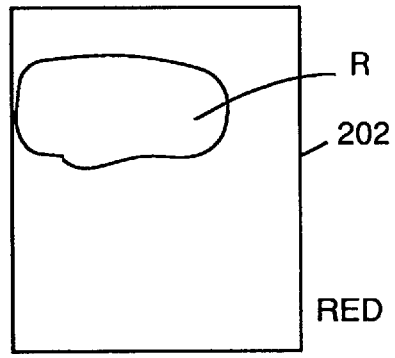
Figure 5B:
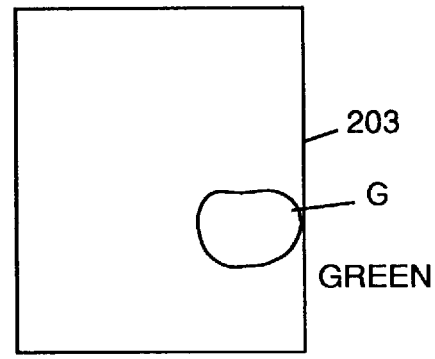
Figure 5B:
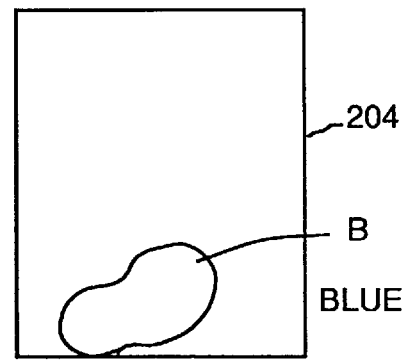

Original reading memory 109 stores, as shown in FIG. 5B, only the data of white and black portions of the original in a plane 201 in which data of black is recorded.

On the other hand, only an image of a portion corresponding to the color of the marker applied to the original is recorded in a plane in which data of red R, green G and blue B each is stored, as shown in those indicated by reference characters 202–204.

6. Description of Control Procedure Based on Flow Chart (a) Main Routine

A procedure of edit processing executed by the control circuit of FIG. 4 is described below following the flow chart of FIG. 6.

In step S1, a display switch subroutine for displaying an operation menu picture for setting of an edit mode on color LCD 115 is executed.

In step S2, an edit mode selected in step S1 is identified and the processing branches into those corresponding to respective edit modes.

If the original coloring mode is selected as an edit mode, processes of steps S3–S7 are executed. Specifically, in step S3, an original image read by a preliminary scanning is displayed on color LCD 115, and operator confirms details of the display and makes a correction of and an addition to an edit area as necessary. The edit area is thus established and reading of the original is started by pressing of a start key by the operator to execute a main scanning. If it is determined that reading is completed in step S4, in step S5, monochrome color processing section 102 applies image processing to image data of the edit area and converts the color of the original image into a prescribed color as described above. In step S6, printing is thereafter carried out and the colored original image is printed on a sheet by printer 30. If it is determined that the printing is completed in step S7, the processing returns to step S1 preparing for the next copying.

If the marker edit mode is selected as an edit mode, processes of steps S8–S14 are carried out. Specifically, in step S8, a marker edit display switch subroutine for determining if the original image read by the preliminary scanning is to be displayed on color LCD 115 or not is carried out. In steps S9 and 10, the original image is displayed on color LCD 115 following the result of the determination. Regarding the marker edit display switch subroutine in step S8, details are given below referring to FIG. 7. In an original display processing subroutine of step S10, a process similar to that of step S3 described above is carried out. When the original image is displayed on color LCD 115, details of the display are confirmed by an operator, and the operator makes a correction of and an addition to an edit area as necessary. The edit area is thus established, and reading of the original is started by pressing of the start key by the operator for executing a main scanning. In step S11, if it is determined that the reading is completed, in step S12, processing sections 102–105 selectively apply an image processing to image data of the edit area set with the marker or pen input tablet 116, an image edit set for each color of the marker is executed, and an original image to which the image edit is applied is printed on a sheet by printer 30. In step S14, if it is determined that the printing is completed, the processing returns to step S1 preparing for the next copying.

If the composite mode is selected as an edit mode, processes of steps S15–S18 are carried out. Specifically, two original images read out are displayed on color LCD 115 in step S15. The operator moves the displayed two original images on the display picture using pen input tablet 116 and specifies a position for composition. The position for composition is thus established. Once the operator presses the start key, image data is read from image memory for composition 130 and original reading memory 109, and two original images are combined by composite processing section 106 in step S16. In step S17, printing process is thereafter carried out and a composite image is printed on a sheet by printer 30. If completion of the printing is determined in step S18, the processing returns to step S1 preparing for the next copying.

If the negative-positive reversing mode, the erasing mode and the trimming mode are selected as edit modes, processes are carried out following the procedure similar to that for the original coloring mode (steps S3–S7) described above. Note that an edit process corresponding to each edit mode is carried out in a step corresponding to step S5. These edit modes are collectively shown as other edit processing mode in steps S19–23.

(b) Marker Edit Display Switch Subroutine

Figure 6:
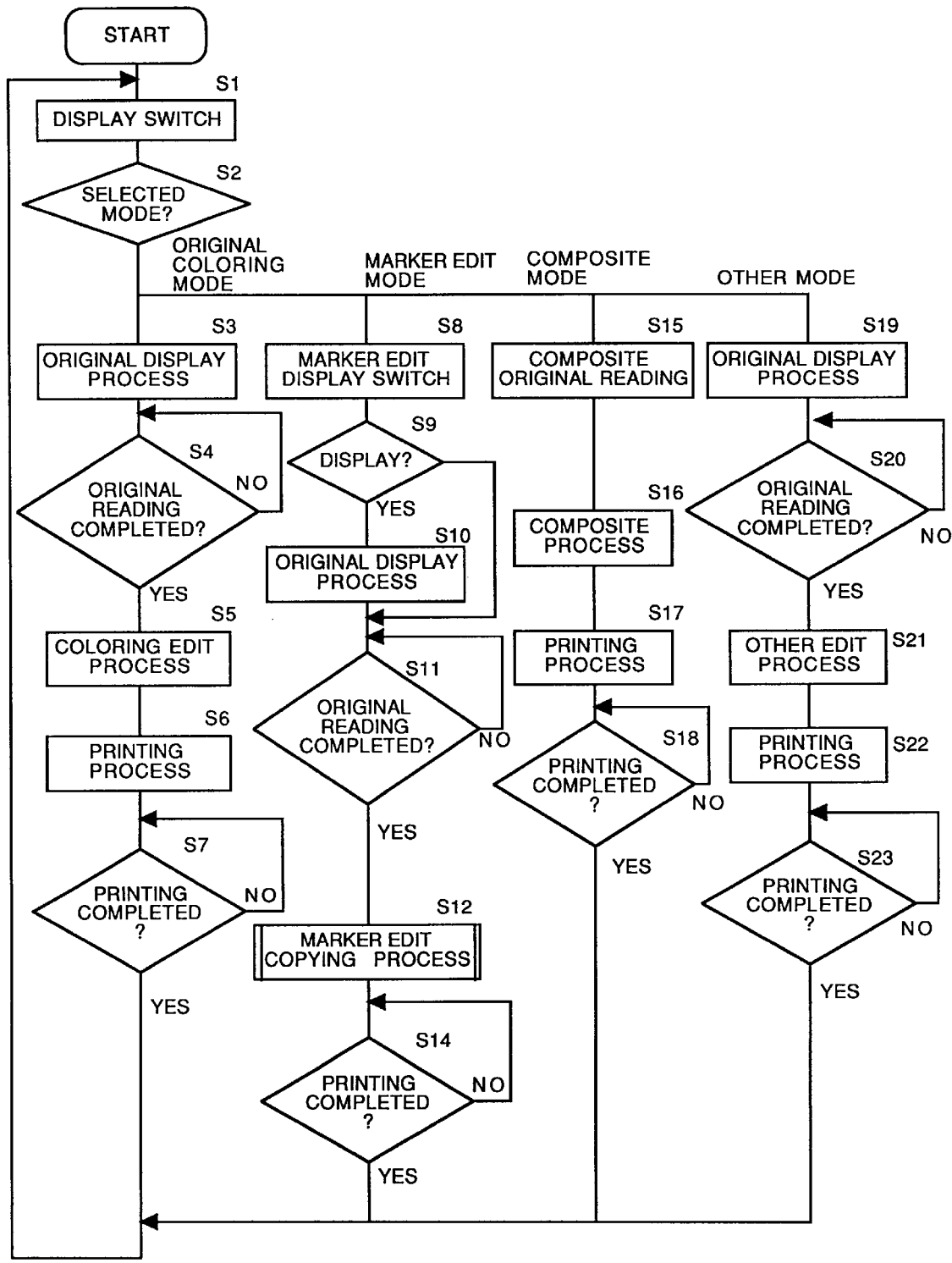
FIG. 6 is a flow chart showing a procedure of edit processing carried out by the control circuit of FIG. 4.
Figure 7:
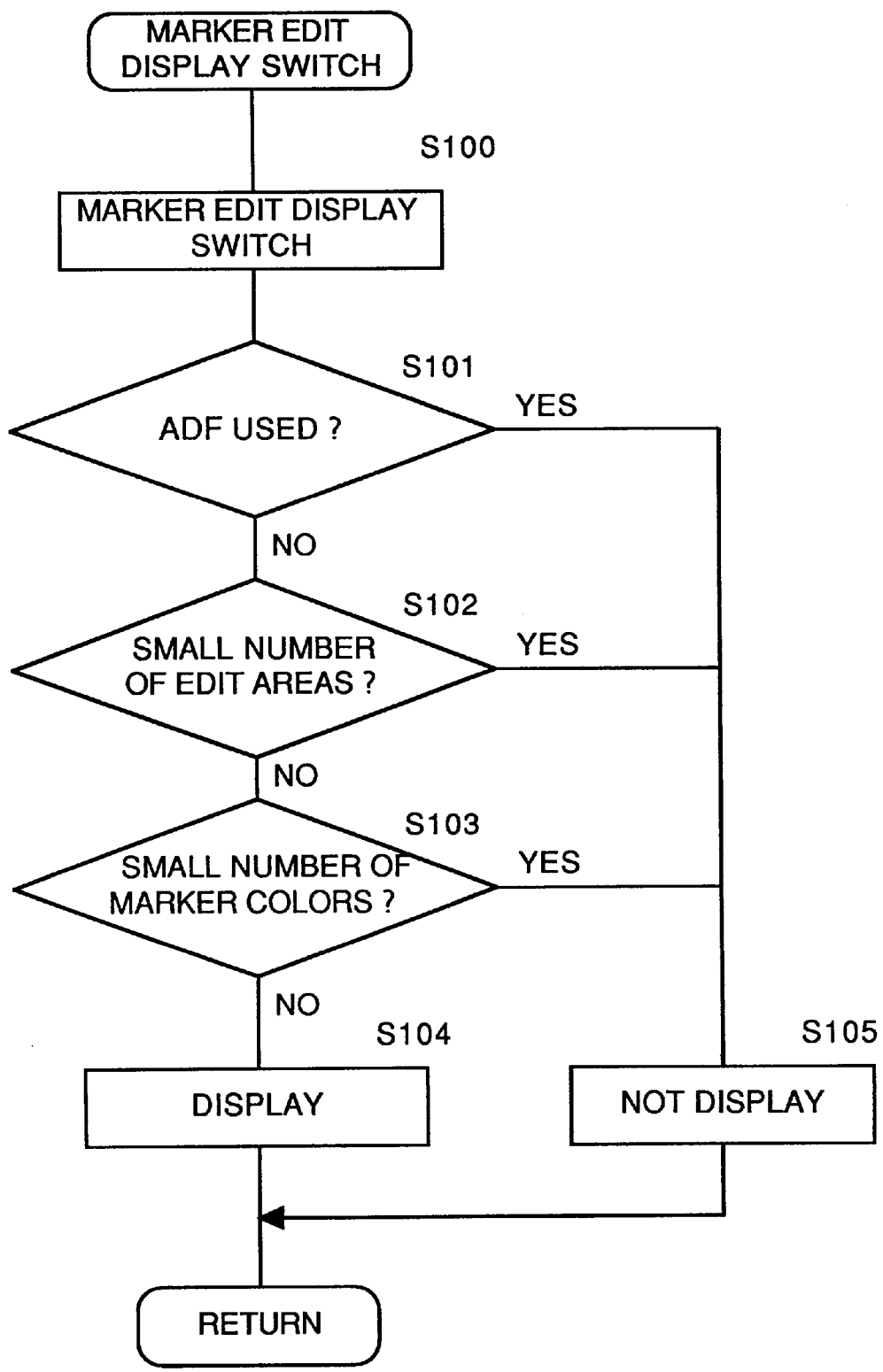
FIG. 7 is a flow chart showing processes in the marker edit display switch routine (S8) of FIG. 6.

The marker edit display switch subroutine shown in step S8 in FIG. 6 is next described. FIG. 7 is a flow chart showing a process procedure of the marker edit display switch subroutine.

When the marker edit mode is selected using the picture for selecting the edit mode as shown in step S1 of FIG. 6 described above, in step S100 of FIG. 7, a picture for setting a color of a marker to be used as well as an edit mode corresponding thereto is displayed on color LCD 115.

Figure 8:
FIG. 8 shows a picture for designating details of the edit for markers.

FIG. 8 shows a picture displayed at this time. An operator can arbitrarily select a combination of a color of a marker and an edit mode corresponding to the color of the marker by operating with this picture.

Referring to FIG. 8, the operator can arbitrarily select desired ones of the colors of the marker and processings corresponding thereto surrounded by the frames numbered from 1 to 8. In each of the frames of 1–8, eight colors indicating colors of the marker are displayed on the left side, and four kinds of edit modes which can be set as well as a color palette are displayed on the right side.

The operator can easily set a color of the marker and edit mode corresponding to the color by selecting desired ones in the frames of 1–8.

For example, if the operator selects one of the colors of the marker displayed on the left side (e.g., red) in the frame of 1, and selects "trimming" from the edit modes on the right side in the frame, the trimming is set as a process corresponding to the red marker. Similarly, a specific process corresponding to a specific color of the marker can be set in the frame of 2.

If the marker color of red is selected in each of the frames 1 and 2, "NP reverse" is selected in the frame of 1 and "trimming" is selected in the frame of 2, two functions of "NP reverse" and "trimming" can be applied to the red marker color.

If "erase" is selected in each of the frames of 1 and 2, red is selected as the marker color in the frame of 1 and blue is selected as the marker color in the frame of 2, the erase processing is possible by using both of the red and blue marker colors.

Since the number of colors of the marker is eight and eight frames are prepared, at least one process can be allocated to each of the colors of the marker.

The negative-positive reverse, trimming, erase, and original coloring modes that can be set in the marker edit mode are respectively displayed as edit modes. If the original coloring mode is selected, any one of "coloring background" and "coloring characters" displayed below is selected and a color to be changed to is specified using the color palette displayed. Accordingly, the color of the background portion or the character portion of the original designated is changed to the specified color.

The print key is pressed to start reading of the original by image reader 30.

Referring to FIG. 7 again, once reading of the original is thus started, determination is made as to if a marked original is placed at the platen using ADF 200 in step S101. If the answer is NO in step S101, whether or not the number of edit areas of the original specified with the marker is small is determined in step S102. If the answer is NO in step S102, whether or not the number of colors designated with the marker is small is determined in step S103. If the answer is NO in step S103, it is determined that the read original with marking is displayed in step S104. Following this determination, the original image is displayed on color LCD 115. This display of the original image on color LCD 115 is for addition to and correction of the specified details by the marker. Details are described below.

If ADF 200 is used (YES in step S101), or the number of edit areas is small (YES in step S102), or the number of colors of the marker is small (YES in step S103), it is determined that no display is provided in step S105.

If ADF 200 is used, it is highly possible that copies of volumes of originals are to be output. In this case, if images of the originals are displayed on color LCD 115 one by one, productivity of copying is dramatically reduced. Therefore, the process of displaying the original in step S10 is not executed.

If the number of edit areas or the number of maker colors specified with the marker is small, marking operation by the operator is simple. If the original is displayed one by one for confirmation by the operator as to whether the addition and the correction are made or not when such a simple marker specification is made, operation by the operator becomes complicate. Accordingly, if the number of edit areas or the number of the colors of the marker is small, display of an original in step S10 is not carried out.

Figure 9:
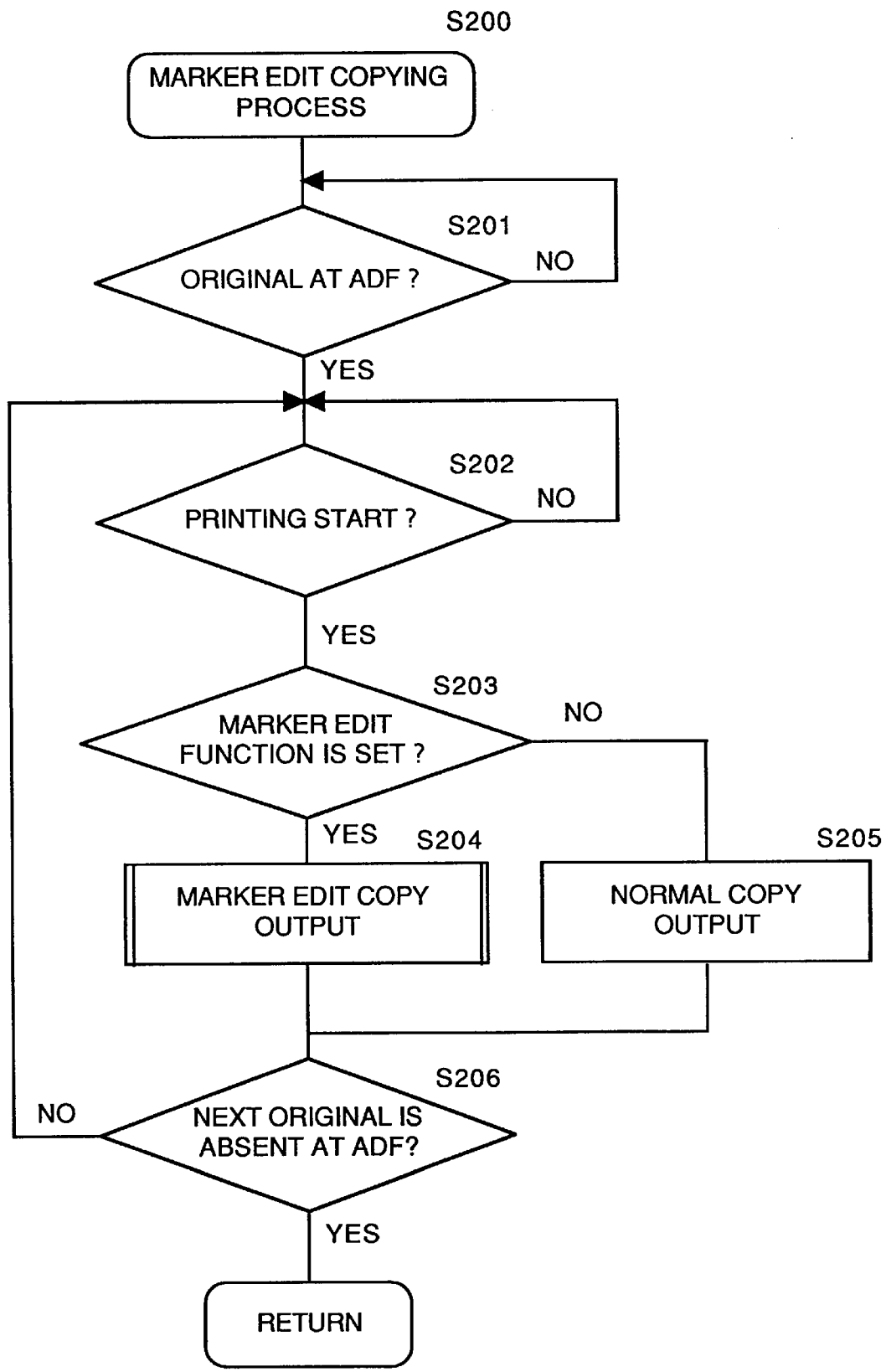
FIG. 9 is a flow chart showing processes in the marker edit copying process (S12) of FIG. 6.

FIG. 9 is a flow chart showing processes in the marker edit copying process (S12) of FIG. 6.

Referring to FIG. 9, when an original is set at ADF 200 in step S201 and printing is started in step S202, whether the marker edit function is set or not is checked in step S203. If the function is set, a marker edit copy is output in step S204. If the function is not set, a normal copy output is made in step S205. Whether the next original is absent at ADF 200 or not is determined in step S206. If the answer is YES, the process returns and if NO, the process is carried out from step S202.

Figure 10:
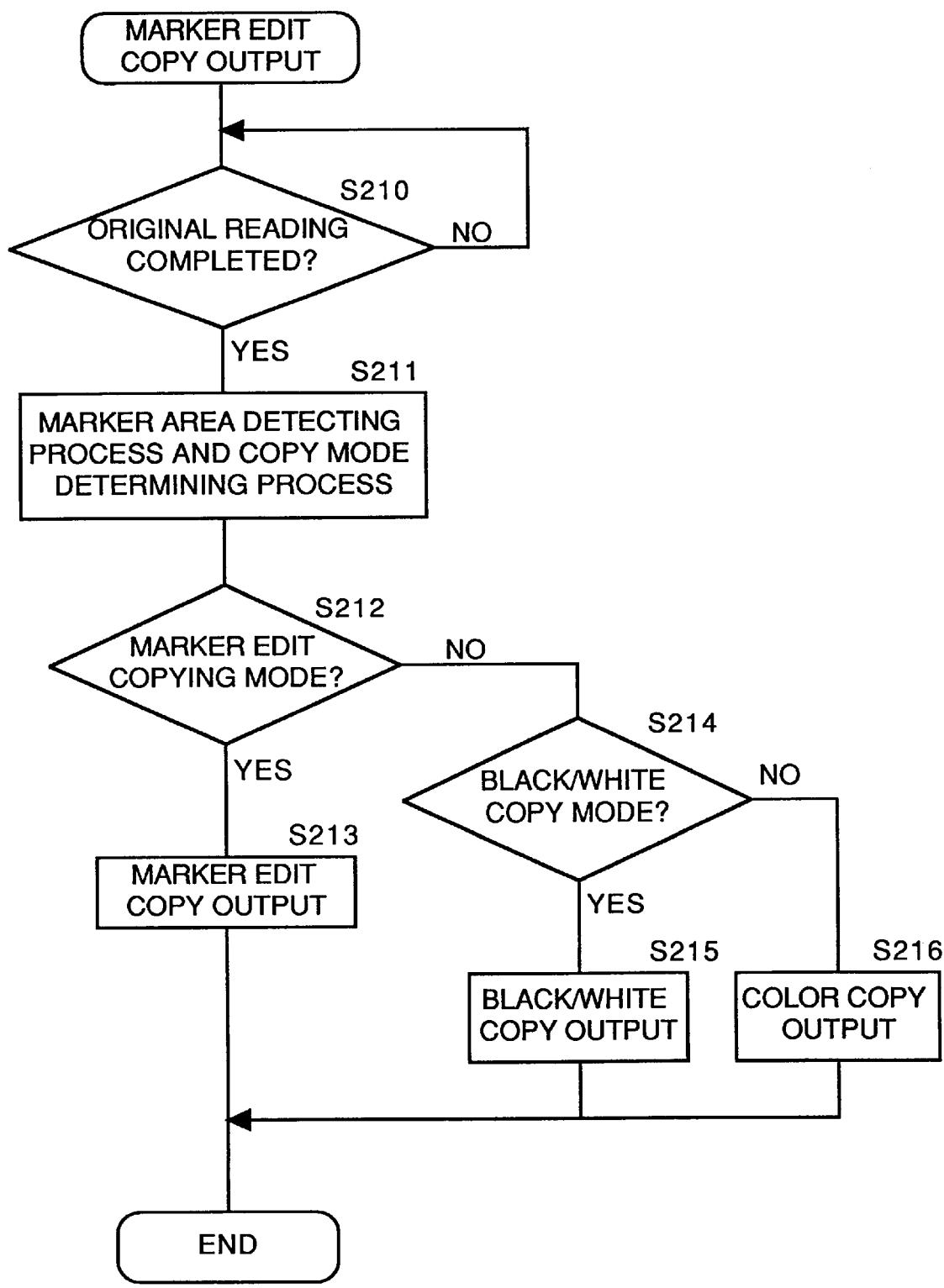
FIG. 10 is a flow chart showing processes in the marker edit copy output (S204) of FIG. 9.

FIG. 10 is a flow chart showing an operation of the marker edit copy output of step S204 of FIG. 9.

When reading of an original is completed in step S210, a process of detecting a marker area and a process of determining a copy mode are executed in step S211.

If the marker edit copy mode is set in step S212, market edit copy output is made in step S213. If the marker edit copy mode is not set, if the copy mode is the black and white copy mode or the color copy mode is determined in step S214. If the black and white copy mode is set, black and white copy output is made in step S215. If the color copy mode is set, color copy output is made in step S216.

Figure 11:
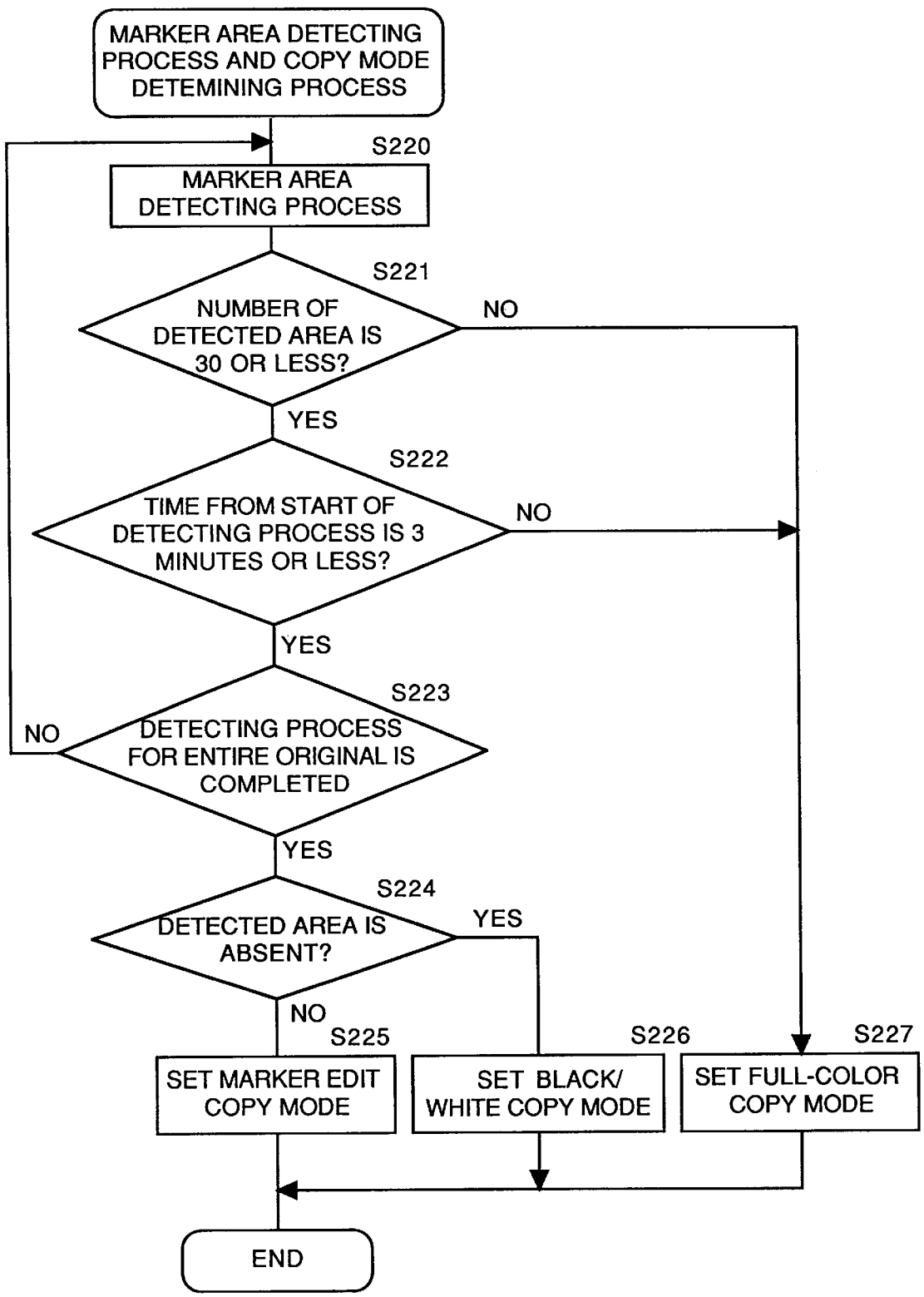
FIG. 11 is a flow chart showing processes in the marker area detecting process and the copy mode determining process (S211) of FIG. 10.

FIG. 11 is a flow chart showing operations of a process of detecting a marker area as well as a process of determining a copy mode in step S211 of FIG. 10.

In step S220, a marker area is detected. Simultaneously, the number of marker areas detected (the number of marker areas in image data) is checked in step S221. If the number of detected areas exceeds 30, the full-color copy mode in which the marker edit process is not applied is set in step S227.

The time from start of the marker area detection is measured in the next step S222. If the time exceeds three minutes, the full-color copy mode in which the marker edit process is not executed is set in step S227. In step S223, whether or not the marker area detecting process is applied to the entire original is determined in step S223. If the answer is YES, the process of step S224 is carried out.

If it is determined that no marker area is detected in step S224, the black and white copy mode is set in step S226.

If it is determined that there is a detected area in step S224, the marker edit copy mode is set in step S225.

If the answer is NO in step S223, detection of a marker area is continued starting from step S220, and determination is made simultaneously in steps S221, S222 and S223.

According to the flow chart, when detection of marker areas is being proceeded, if the number of detected areas exceeds 30 or the time required for the detection exceeds three minutes, the marker edit (processing of image data) is not executed. The reason is that it is highly possible that a color original is handled. In this case, image data of full colors is output. On the other hand, if the number of detected areas during the marker area detection is 30 or less and detection for the entire original is completed within three minutes, the marker edit (processing of image data) is carried out.

Even if the marker edit mode for a color original is set, the color original is output as it is. Accordingly, a copying machine in which the number of errors in copying can be reduced can be provided.

According to the embodiment above, the full color copy mode is set if the number of detected areas or the time required for detection exceeds a prescribed value. However, a warning may be issued in such a case.

At the same time that a warning is issued, whether the marker edit is to be carried out or not may be confirmed by the operator. In this case, the operator can select, after the warning is issued, if the marker edit copy mode is continued or the full-color copy mode is set. A key for such a selection is displayed on display section 115.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
receiving means for receiving image data;
detecting means for detecting from said image data received, an edit area to which a prescribed edit is applied;
measuring means for measuring time for detection by said detecting means; and
forming means for forming an image based on said received image data without editing it if a result of said measuring shows said time for detection exceeds a prescribed time.

2. The image forming apparatus according to claim 1, further comprising means for counting number of edit areas detected by said detecting means.

3. The image forming apparatus according to claim 2, wherein
said forming means forms an image based on said received image data without editing it if the number of edit areas counted by said counting means exceeds a prescribed number.

4. The image forming apparatus according to claim 1, wherein
said edit area is a closed area surrounded by a prescribed color.

5. The image forming apparatus according to claim 1, wherein
said forming means forms an image after applying a prescribed edit to said detected edit area if a result of measuring by said measuring means shows that detection of the edit area is completed within said prescribed time.

6. The image forming apparatus according to claim 1, further comprising informing means for alarming if said time for detection exceeds a prescribed time.

7. An image editing apparatus comprising:
receiving means for receiving image data;
setting means for setting an edit mode to edit said image data received;
determining means for determining if said received image data is appropriate for edit when said edit mode is set; and
informing means for alarming if a result of determination by said determining means shows that the image data is not appropriate for edit.

8. The image editing apparatus according to claim 7, further comprising
an instructing means for instructing continuation of a process in said edit mode, and
means for continuing the process in said edit mode if an instruction is given by said instructing means even after said alarming.

9. The image editing apparatus according to claim 7, further comprising control means for controlling such that edit is not executed if a result of determination by said determining means shows that the image data is not appropriate for edit.

10. The image editing apparatus according to claim 7, further comprising
detecting means for detecting an edit area from said received image data and
measuring means for measuring time for detection by said detecting means.

11. The image editing apparatus according to claim 10, wherein
said determining means determines that said received image data is not appropriate for edit if said time for detection exceeds a prescribed time.

12. The image editing apparatus according to claim 7, wherein
said edit area is a closed area surrounded by a prescribed color.

13. The image editing apparatus according to claim 7, further comprising
detecting means for detecting an edit area from said received image data, and
counting means for counting number of edit areas detected by said detecting means.

14. The image editing apparatus according to claim 13, wherein
said determining means determines that said received image data is not appropriate for edit if the number of said edit areas exceeds a prescribed number.

15. An image editing apparatus comprising:
reading means for reading an image of an original to obtain image data;
detecting means for detecting a closed area surrounded by a specified color based on said image data which is read;
editing means for applying a prescribed edit to image data included in the detected closed area;
measuring means for measuring time for detection by said detecting means; and
control means for controlling such that said edit is not applied if said time for detection exceeds a prescribed time.

16. The image editing apparatus according to claim 15, further comprising counting means for counting number of said closed area, and wherein
said control means controls such that said edit is not applied if the number of said closed area exceeds a prescribed number.

17. The image editing apparatus according to claim 15, wherein
said control means applies said edit to the detected edit area if a result of measuring shows that said time for detection does not exceed a prescribed time.

18. The image editing apparatus according to claim 15, further comprising informing means for alarming if a result of measuring shows that said time for detection exceeds a prescribed time.

19. Image editing apparatus comprising:
means for obtaining image data by reading an image of an original;
means for storing said image data obtained, by separating the data into plural kinds of color data;
detecting means for detecting, from said color data stored, a closed area formed of one kind of color data;
means for measuring time for which detection is carried out by said detecting means; and
output means for outputting said obtained image data without editing it if said time measured exceeds a prescribed time and outputting said obtained image data after applying a prescribed edit to image data in said closed area if detection of said closed area is completed within said prescribed time.

20. The image editing apparatus according to claim 19, further comprising means for counting number of said closed area, and wherein
said output means outputs said obtained image data without editing it if the number of said closed area counted exceeds a prescribed number.

* * * * *